United States Patent
Perritt, Jr.

(10) Patent No.: US 12,354,619 B1
(45) Date of Patent: Jul. 8, 2025

(54) TABLECONVERSE AUDIO SYSTEM: DIRECTIONAL SPEECH ENHANCEMENT FOR RESTAURANT TABLES

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/195,652

(22) Filed: Apr. 30, 2025

(51) Int. Cl.
| | | |
|---|---|---|
| G10L 21/0232 | (2013.01) | |
| G06F 3/16 | (2006.01) | |
| G10L 21/0216 | (2013.01) | |
| G10L 21/028 | (2013.01) | |
| H04R 1/02 | (2006.01) | |
| H04R 1/28 | (2006.01) | |

(Continued)

(52) U.S. Cl.
CPC .......... *G10L 21/0232* (2013.01); *G06F 3/162* (2013.01); *G06F 3/165* (2013.01); *G10L 21/028* (2013.01); *H04R 1/025* (2013.01); *H04R 1/2892* (2013.01); *H04R 1/403* (2013.01); *H04R 3/12* (2013.01); *G10L 2021/02166* (2013.01)

(58) Field of Classification Search
CPC .............. G10L 21/0232; G10L 21/028; G10L 21/0264; G10L 21/0316; G10L 2021/02166; G06F 3/162; G06F 3/165; H04R 1/025; H04R 1/2892; H04R 1/403; H04R 3/12; H04R 1/406; H04R 1/32; H04R 3/005; H04R 25/507; H04R 25/505; H04R 25/552; H04R 5/027; H04R 5/033; H04R 5/0335; H04R 2225/41; H04R 2225/43; G10K 11/17854; B60N 2/90; B60R 11/02; B60R 11/04; B60R 16/02
See application file for complete search history.

(56) References Cited

U.S. PATENT DOCUMENTS

| | | |
|---|---|---|
| 7,110,951 B1 | 9/2006 | Pederson |
| 8,229,740 B2 | 7/2012 | Nordholm |
| 10,334,390 B2 | 6/2019 | Bakish |

(Continued)

FOREIGN PATENT DOCUMENTS

JP 2009040368 A * 2/2009

*Primary Examiner* — Yogeshkumar Patel
(74) *Attorney, Agent, or Firm* — Henry H. Perrits, Jr.

(57) ABSTRACT

A speech enhancement system for restaurant environments that improves conversation intelligibility amid ambient noise without requiring diners to wear devices. The system comprises directional microphones embedded in restaurant tables that capture speech while rejecting ambient noise, a digital signal processing unit that isolates and enhances speech signals, and directional speakers that deliver enhanced audio to specific listening positions. Beamforming technology and artificial intelligence-driven noise suppression provide precise speech capture and enhancement, while parametric audio technology creates focused sound delivery zones. The system preserves natural conversation dynamics while significantly improving speech intelligibility in noisy dining environments. Users can adjust enhancement parameters via table-embedded controls or a mobile application. Alternative embodiments include bone-conduction audio delivery through chair headrests and seatbacks, multi-language support, specialized processing for hearing-impaired diners, and wireless connectivity for smartphones and hearing aids.

18 Claims, 8 Drawing Sheets

(51) Int. Cl.
*H04R 1/40* (2006.01)
*H04R 3/12* (2006.01)

(56) References Cited

U.S. PATENT DOCUMENTS

| | | |
|---|---|---|
| 10,609,475 B2 | 3/2020 | Benattar |
| 2016/0071526 A1* | 3/2016 | Wingate ................. G01S 3/807 |
| | | 704/233 |
| 2016/0165342 A1 | 6/2016 | Benattar |
| 2018/0213321 A1 | 7/2018 | Sampson |
| 2020/0221220 A1* | 7/2020 | Benattar ................ H04R 5/033 |
| 2023/0319488 A1* | 10/2023 | Corey ................. H04R 25/558 |
| | | 381/318 |

* cited by examiner

TABLECONVERSE AUDIO SYSTEM: DIRECTIONAL SPEECH ENHANCEMENT FOR RESTAURANT TABLES

CROSS-REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

Background of the Invention

Field of the Invention

The present invention relates to audio enhancement systems, specifically a table-integrated directional microphone and speaker array designed to improve speech intelligibility in noisy restaurant environments.

Background

Restaurants, bars, cafes, and other social dining venues frequently suffer from high ambient noise levels generated by music, crowd conversations, kitchen activity, and other environmental sources. Studies have shown that ambient noise in popular restaurants often exceeds 80 decibels, a level at which normal conversation becomes difficult and strained. This "cocktail party problem"—the challenge of focusing on specific voices amid competing noise-creates significant communication barriers for diners.

Conventional solutions to this problem have notable limitations:

Passive noise reduction techniques (e.g., sound-absorbing panels, acoustic ceiling treatments, fabric dividers) provide limited effectiveness in open dining spaces and require significant architectural modifications that alter restaurant aesthetics.

Personal hearing aids or amplifiers isolate users from natural conversation dynamics, require individual ownership and maintenance, and may stigmatize users with visible assistive technology.

Existing tabletop microphone systems employ omnidirectional microphones, resulting in feedback loops, poor noise discrimination, and unnatural audio reproduction.

Noise-canceling booths require enclosed dining spaces, limiting seating flexibility and social interaction with other diners.

Portable voice amplifiers create uneven audio distribution and potential disturbance to neighboring tables.

While machine learning can develop algorithms for distinguishing speech from noise, much machine learning occurs in the context of very large databases, where it is used in advance of operational deployment to develop algorithms for that later deployment. Such an approach is not suitable for the real-time needs of conversation in a restaurant.

A significant unmet need remains for a discreet, adaptive, and directional audio enhancement system that operates effectively in open restaurant settings without requiring user-worn devices, extensive restaurant redesign, or isolated dining spaces.

SUMMARY OF THE INVENTION

The present invention, the TableConverse Audio System, addresses these needs through a novel integration of beamforming microphone technology, artificial intelligence-driven noise suppression, and directional audio delivery specifically designed for restaurant table environments.

In its primary embodiment, the invention comprises:

A distributed array of beamforming microphones embedded in the perimeter of a dining table, capable of isolating speech signals from seated users while actively rejecting off-axis ambient noise;

An artificial intelligence-powered digital signal processing (DSP) module that distinguishes and enhances human speech while suppressing ambient restaurant noise in real-time;

A complementary array of directional speakers that create focused audio zones, delivering enhanced speech signals to specific listening positions without audio leakage to neighboring tables;

User-adjustable controls for personalizing volume levels, noise cancellation intensity, and audio focus per individual dining position.

The system offers significant advantages over prior art. It:

Eliminates feedback loops that plague conventional microphone-speaker setups through precise directional control and signal processing;

Operates without requiring diners to wear headphones, earpieces, or other personal devices that detract from the natural dining experience;

Functions effectively in open restaurant spaces without requiring architectural modifications or enclosed booths;

Scales adaptively to accommodate different table sizes, shapes, and dining group compositions;

Preserves the ambient atmosphere of the restaurant while enhancing speech intelligibility.

Optional embodiments include bone-conduction technology integrated into chair headrests for additional privacy, lightweight, wireless earpieces that deliver enhanced audio without blocking natural hearing, wireless smartphone control, adjustable ambient sound mixing, and multi-language support.

BRIEF DESCRIPTION OF THE DRAWINGS

The accompanying drawings, which are incorporated into and form a part of this specification, illustrate embodiments of the invention and, together with the description, serve to explain the principles of the invention.

DETAILED DESCRIPTION OF THE INVENTION

Figure 1:
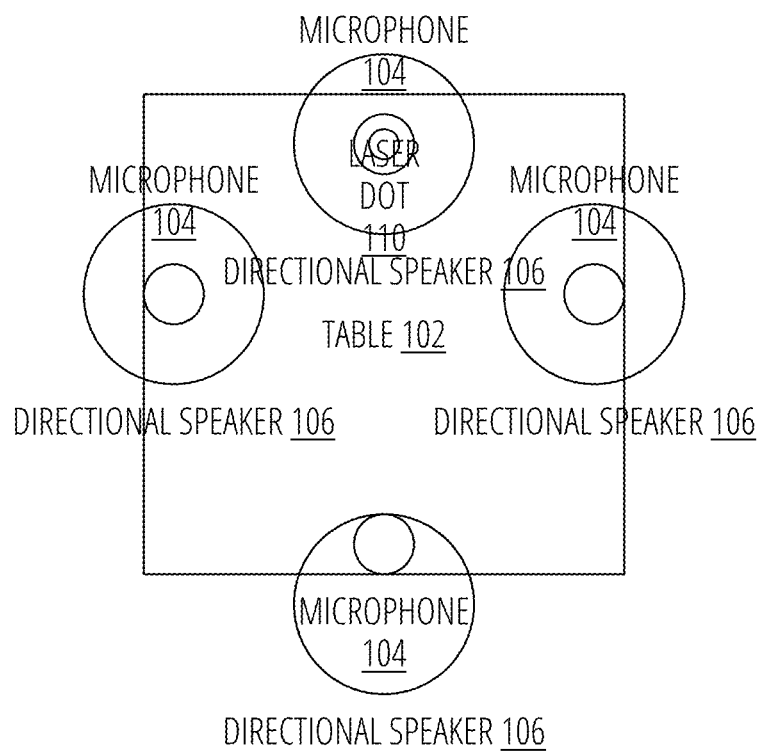
FIG. 1 is an overhead view of the system and its major components.

FIG. 1 is an overhead view of the major components of the system. It comprises a table 102, a plurality of microphones 104, a plurality of directional speakers 106, and a plurality of laser sources configures to project laser dots, only one of which is shown laser dot 110. The microphones 104 are connected in a microphone array.

The microphone array consists of multiple miniature microphones embedded along the perimeter of the dining table, positioned to optimize voice capture from seated diners. These microphones utilize beamforming technology to create highly directional pickup patterns focused on the oral-nasal region of seated diners.

The microphones are arranged in a phased array configuration that enables: dynamic adjustment of pickup patterns based on speaker position, rejection of sounds originating from above or below the target zone, active cancellation of ambient noise through differential pickup, and seamless audio zone transitions as diners move or reposition.

The microphones operate in the frequency range of 100 Hz to 8 kHz, optimized for human speech capture, and feature vibration isolation mounting to prevent the capture of table-transmitted sounds, such as silverware and plate movement.

The directional speakers 106 receive enhanced audio signals from the digital processing unit (FIG. 2) and create focused audio zones for each dining position with output signals aimed at the seated diner. Small, directional speakers mounted either within the table structure or in overhead fixtures utilize parametric audio technology and constructive interference to create focused audio beams or "sound cones" directed precisely at each listener's position.

The speakers employ parametric audio technology that creates highly directional sound waves, minimizing audio bleed between listening positions and to adjacent tables. This directional approach allows for individual volume control at each dining position, personalized audio enhancement settings, and conversational privacy even in open dining spaces A low power laser is aligned with each directional speaker 106 and configured to project a beams of light downward, creating a laser dot 110 at each seat to assist in positioning diners under the cone of sound emitted by the directional speaker 106.

The system may comprise wireless connectivity allowing integration with mobile devices and hearing aids.

The system may include a failover system that transitions from bone conduction to air-conduction speakers upon detecting loss of back contact.

Figure 2:
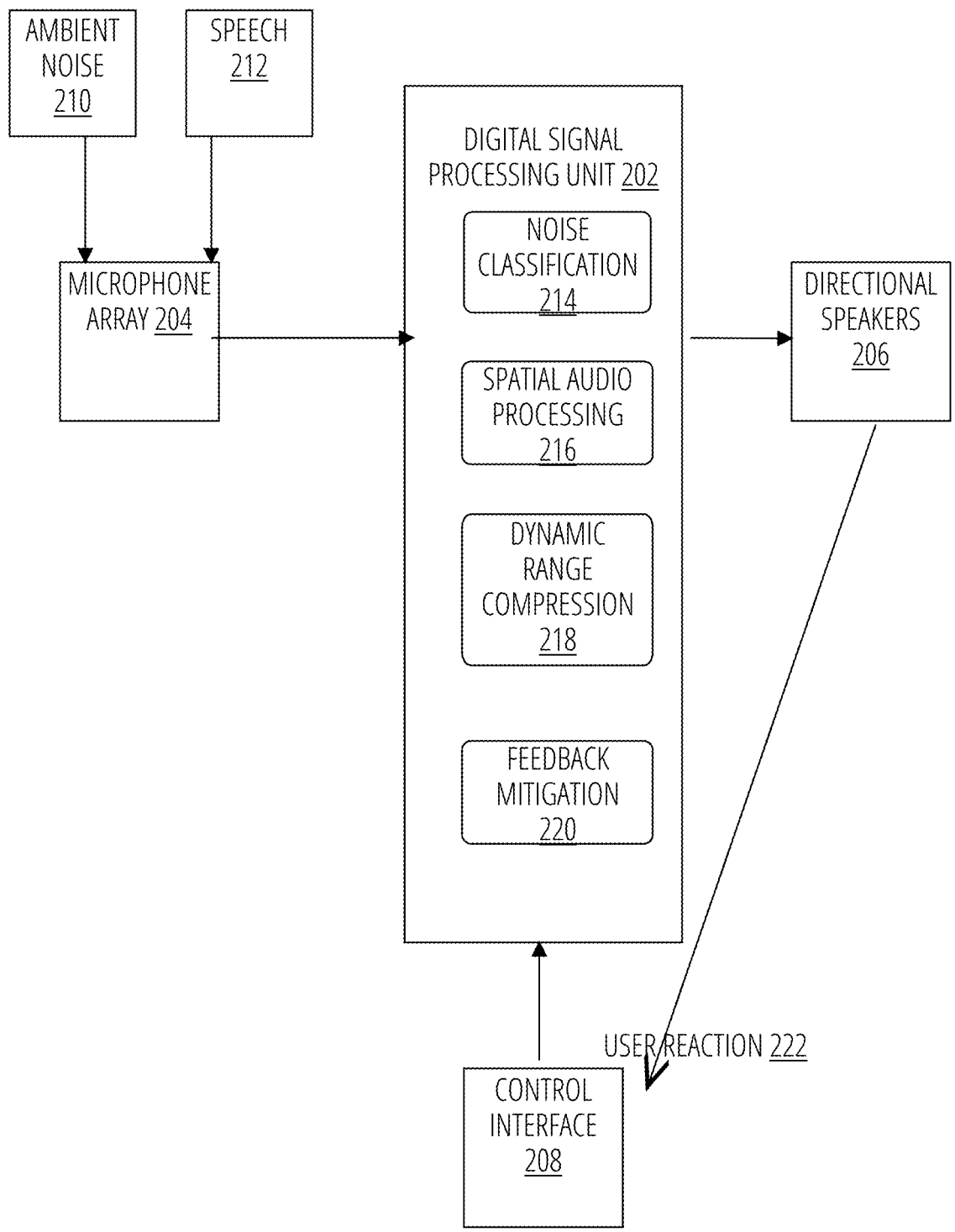
FIG. 2 illustrates the digital signal processor and its interaction with major components.

FIG. 2 shows how the main components of the system interact. The system comprises a digital signal processing unit 202, a microphone array 204, a directional speakers 206, a control interface 208, an ambient noise 210, a speech 212, a noise classification 214, a spatial audio processing 216, a dynamic range compression 218, a feedback mitigation 220, and user reaction 222.

The plurality of microphones constitute the microphone array 204 which receives ambient noise 210 and speech from participating diners diner seated at the table 212 it transmits signals representing these sounds to the digital signal processing unit 202, which also receives inputs from the control interface 208. The digital signal processing unit 202 transmits filtered and shaped sound to the directional speakers 206, which emit sound focused on individual seated diners.

Diners provide user reactions 222 from the sound they hear from the directional speakers 206 and make appropriate adjustments through their control interface 208.

The digital signal processing unit 202 comprises a number of subsystems that classify noise 214 and remove it, perform spatial audio processing to identify directions from which sounds come 216 by comparing signals from different microphones, perform dynamic range compression 218 to improve efficiency and intelligibility to diners, and adapt responses according to changing frequencies 220. The digital signal processing unit 202 also comprises a feedback mitigation subsystem 224.

Beamforming is a signal processing technique that uses an array of microphones or speakers to focus sound capture or projection in a specific direction, while suppressing noise from other angles. In the TableConverse Audio System, beamforming isolates speech from individual diners while rejecting ambient noise.

Beamforming relies on phase manipulation across multiple microphones/speakers. Multiple microphones capture the same sound at slightly different times. By delaying and combining signals, the system amplifies sound coming from a target direction (e.g., a speaker at the table) while canceling noise from other angles.

In speaker beamforming an array of speakers emits sound waves that constructively interfere in a desired direction (e.g., toward a listener's seat). This creates a focused "audio beam" instead of spreading sound everywhere. Small directional speakers are placed near each seat. Processed speech is routed to the nearest speaker array. The speakers emit sound waves that constructively combine at the target listener's position. This prevents audio "leakage" to other seats or microphones (reducing feedback). For example, User A's voice is projected to User B's seat, not to User C's, if A and B but not C are members of the same conversational group.

Microphone Beamforming for speech capture in the TableConverse System relies on microphone array placement. Small, embedded microphones are placed along the table edge, one per seat. The system detects voice direction by comparing arrival times at each microphone—the Time Difference of Arrival (TDOA). It applies digital delays to align signals from the target speaker. Combined signals reinforce speech while suppressing background noise, such as clattering dishes, and cross-talk from other diners' voices. For example if User A speaks, the beamformer locks onto their position and ignores User B's voice.

Beamforming enables the TableConverse System to focus on individual speakers in noisy environments, deliver private, localized audio without spillover, and minimize feedback between microphones and speakers.

The digital signal processing unit employs machine learning algorithms trained specifically to distinguish human speech from restaurant ambient noise.

Deploying machine learning (ML) in real time to distinguish speech from ambient noise involves a combination of signal processing, model inference, and efficient system integration. The goal is to classify audio segments in real time as either speech or ambient noise with low latency—processing within milliseconds-using lightweight models in varying noise conditions. Combined speech and noise audio is split into small overlapping frames of 20-50 milliseconds for real-time processing. Raw audio is converted into representations suitable for machine learning, such as Mel-Frequency Cepstral Coefficients (MFCCs), Log-Mel Spectrograms, which retain frequency patterns, Spectral Contrast/Zero-Crossing Rate, which helps distinguish noise, and normalization, which scales representations to improve model robustness.

A machine learning model, such as a 2D Convolutional Neural Network, or a Tiny Recurrent Neural Network (RNN)/Gated Recurrent Unit (GRU), is selected to balance accuracy and speed. Voice Activity Detection (VAD) using rule-based heuristics such as energy thresholds are deployed alongside machine learning for robustness.

The digital signal processing unit captures and maintains spatial audio cues to preserve natural conversation dynamics. Spatial audio cues allow listeners to perceive direction, distance, and immersion in a conversation, mimicking natural hearing. The TableConverse System captures, processes, and reproduces these cues to enhance speech intelligibility while maintaining a realistic soundscape. Beamforming microphones track each speaker's position (azimuth and distance). Direction of arrival (DoA) algorithms tag speech with positional metadata, for example "Speaker 3 is at 45° left". Each seat's speaker emulates sound coming from the original speaker's position, for example, if Trevor is left of you, his voice is panned left.

The digital signal processing unit uses adaptive filters that continuously adjust to changing acoustics, such as if a seated user moves his head.

The digital signal processing unit and the other components of the system operate together with a latency below 15 milliseconds to ensure robust adaptability to conditions.

Figure 3:
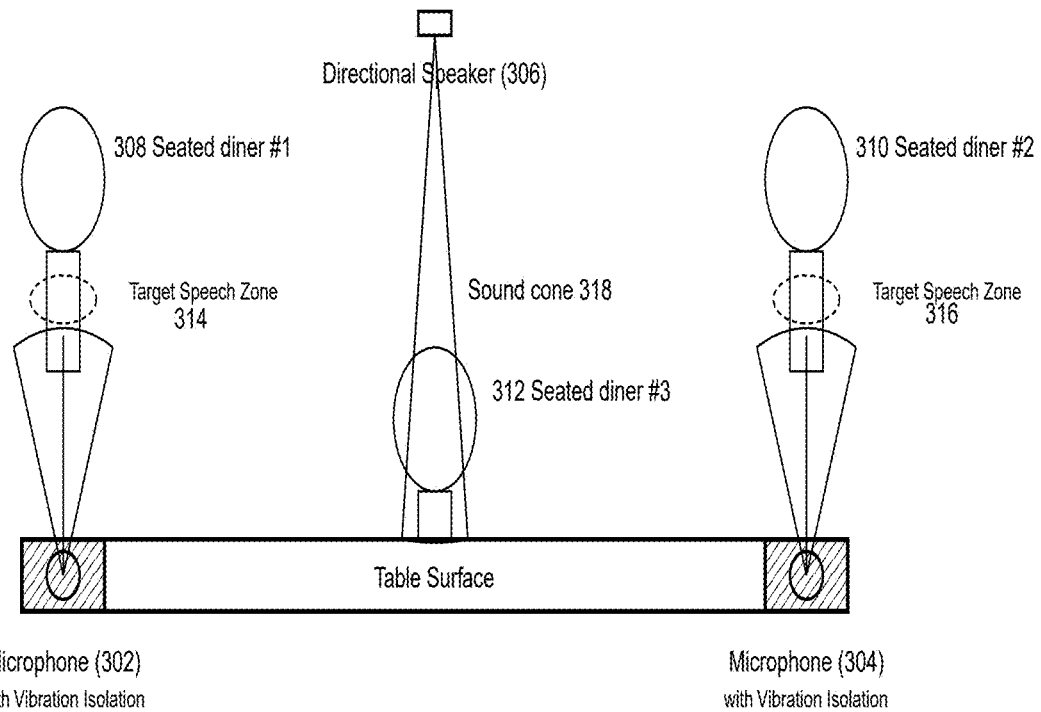
FIG. 3—is a detailed cross-sectional view of the microphone array and speaker placement, showing beam patterns and coverage zones.

FIG. 3 presents a profile view of parts of the system. It shows three seated diners, seated diner number 308, seated diner number two, 310, and seated diner number three, 312. Microphones, 302 and 304, are mounted in the table proximate to each seated diner. Each microphone is configured to have a target speech zone focused on the particular diner with whom it is associated, 314 for seated diner number one 308, and 316 for seated diner number two 310.

FIG. 3 depicts one of a plurality of directional speakers 306 over seated diner number three 312. The cone of emitted sound 318 shows how each speaker is configured to direct sound to the seated diner with whom it is associated.

For ease of illustration, the directional speakers associated with seated diner number one 308 and seated diner number two 310 are not shown, but it should be understood that they have directional speakers identical to the one 306 depicted for seated diner number three 312.

Similarly, the microphone for seated diner number three 312 is not depicted but it should be understood that he, too, has a microphone identical to those 302 and 304 provided for seated diners one and two, 308 and 310.

Figure 4:
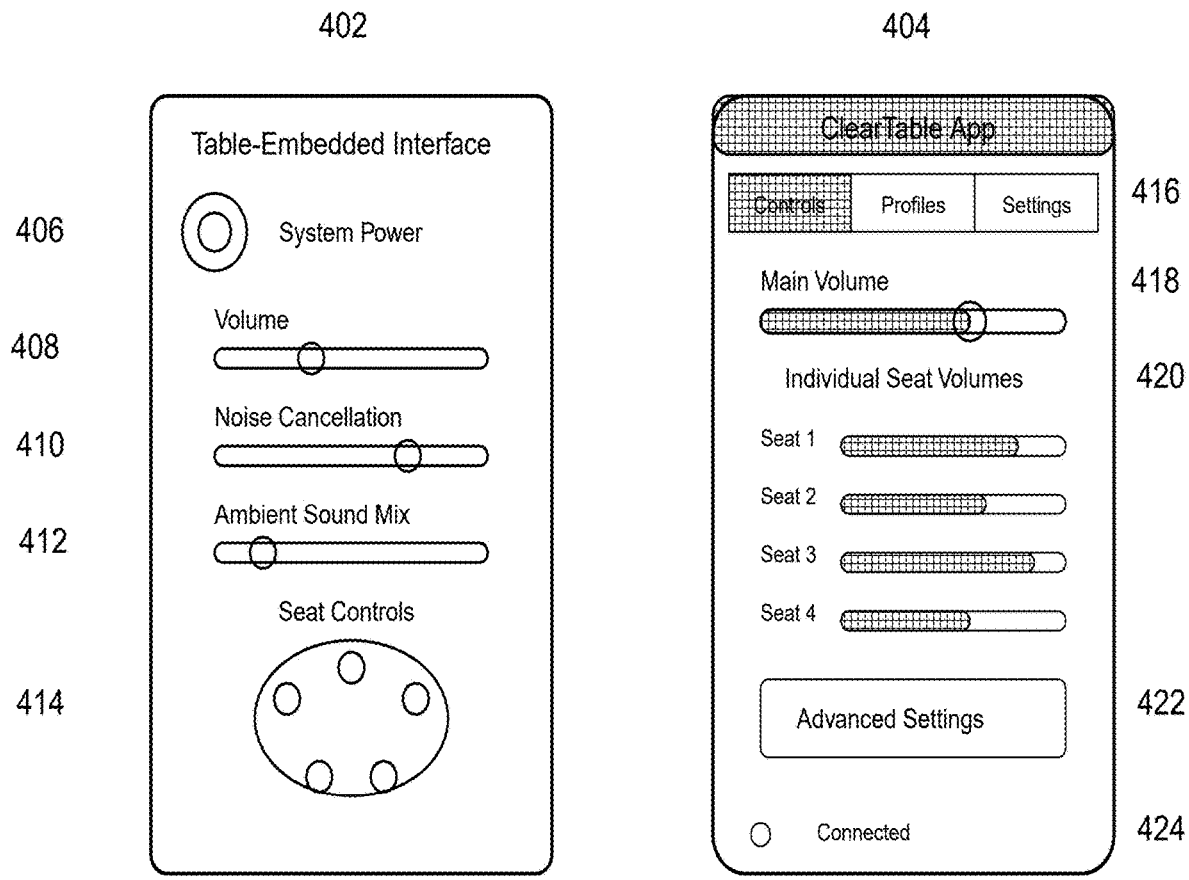
FIG. 4—shows user interface controls, including table-embedded touchpad and mobile application screens.

FIG. 4 depicts the control interface 208, which comprises a table embedded interface 402 and a wireless mobile application interface (ClearTable App 404). The table embedded interface 402 is mounted integral to the table adjacent to each seated diner's microphones. A discreet touchscreen or touch-sensitive surface integrated into the table allows diners to adjust operation of the system. It comprises a button that controls electrical power to the system 406, a volume control 408, a noise cancellation control 410 that adjusts noise cancellation intensity, an ambient sound control 412 that determines the ambient sound mix level, determining how much environmental sound is preserved, and icons for individual seat controls 414.

The system power control 406 controls power for all of the microphones and speakers for that particular table. The volume, noise cancellation, and ambient sound mix controls, 408, 410, and 412, control characteristics of the speaker for each diner position at the table, selectable by the seat controls 414. When a particular seat is selected, its icon is illuminated.

The table embedded interface 402 is illustrated with five diner seats. It should be understood that the system may accommodate a smaller or larger number of seats. Five was selected as the number purely for convenience of illustration.

The ConverseTable ClearTable app 404 can be installed on an individual diner's smart phone. Having installed it, a diner may launch the app and change parameters for the system and set user profiles and settings 416. The main volume control 418 controls the volume for all of the diners seated at that particular table, while the individual seat volume controls 420 control the volumes of sound emitted for each seat. The advanced settings icon 422 allows the system to be configured allows for distant system configurations, such as bone conduction sound transmission, in-the-ear transmission, and sound feedback mitigation controls. A connected light 424 is illuminated when the app is communicating with the system. The advanced settings allow for personal hearing profiles, language selection for potential translation features, integration with restaurant ordering systems, and accessibility options for hearing-impaired users.

The TableConverse ClearTable App 404 is depicted as having controls for four seats. It should be understood that the number of seats controllable with the gap may be fewer than four or greater than four. The number four was selected purely for convenience and illustration.

Alternative configurations (FIG. 5) include guest-optional lightweight, wireless earpieces that deliver enhanced audio without blocking natural hearing and bone-conduction transducers integrated into chair headrests configured to transmit speech vibrations directly through cranial bones to the inner ear, bypassing ambient noise entirely.

This alternative embodiment uses bone conduction transducers (BCTs) embedded in seatbacks to transmit speech vibrations directly to a diner's skull. The BCT vibrates the seatback, transmitting sound via structural conduction through the spine and skull. Unlike air-conducted sound, bone conduction bypasses the eardrum, making it useful in noisy environments. The bone-conduction transducers use adaptive force modulation based on seat pressure sensors.

Key factors affecting transmission include contact pressure (a user should maintain firm back contact), transducer power (higher power means better transmission), and body composition (bone density affects efficiency). An upright posture results in optimal performance and best sound. A slight forward lean of about ten degrees, causing the user to be separated 2-3 inches from the seatback, causes reduced but still audible sound. A moderate lean of about thirty degrees, causing separation from the seatback of 4-6 inches, results in significant signal loss, with lower bass and muffled speech. A full forward hunch greater than 45 degrees, causing separation of more than 6 inches, results in very weak or no transmission.

The system is designed to mitigate loss of effectiveness due to physics and anatomy. To compensate for leaning, the system can incorporate pressure-sensitive transducers that increase vibration intensity when the user leans forward. It also can switch to directional speakers for continuity if the user leans too far forward. The system can also provide posture guidance (haptic feedback) to users by vibrating the seatback to nudge the user subtly if the user leans too far. An alternative embodiment comprises bone-conduction tranducers mounted in dining chair headrests or seatbacks for alternative audio delivery.

Figure 5:
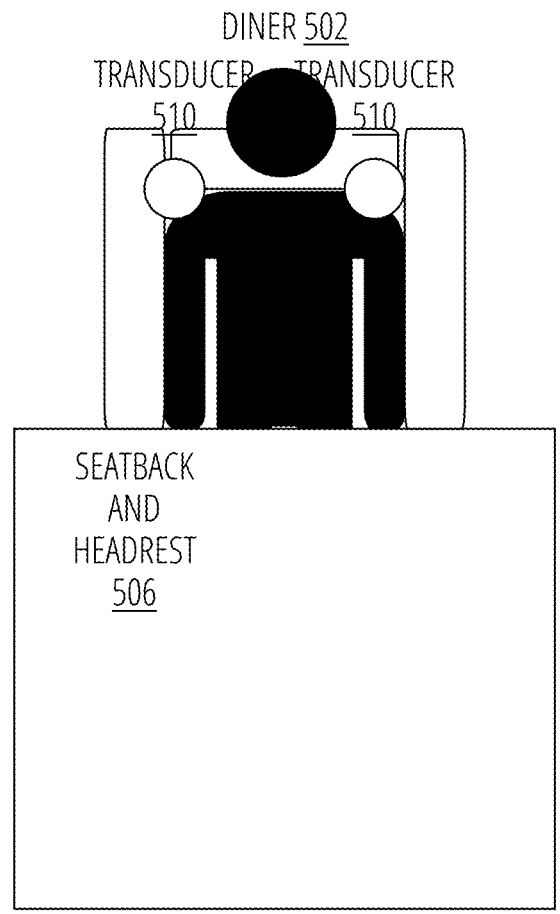
FIG. 5—Depicts and alternative embodiment featuring bone-conduction transducers integrated into dining chair headrests and seatbacks.

FIG. 5 depicts such an embodiment. A diner 502 is seated at a table 504, leaning against a seatback and headrest 506. Transducers 510 mounted in the seatback and headrest 506 communicate sounds into the diner's spine and skull, bypassing his eardrums.

For larger dining tables the system incorporates zone-based processing that creates separate audio zones for subgroups engaged in different conversations at one table. This configuration optimizes audio delivery based on conversation groupings, detecting which diners are engaged in conversation with each other and creating appropriate audio routing.

Figure 6:
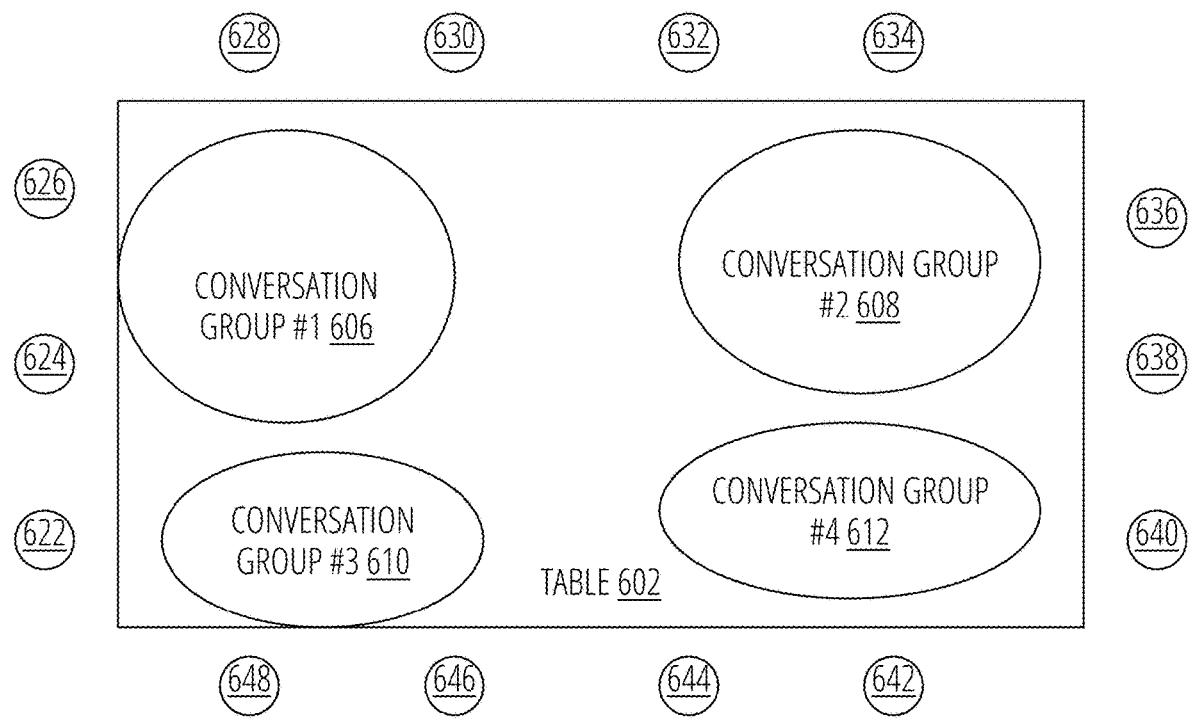
FIG. 6—Shows separate conversation groups for a large table.

FIG. 6 depicts a table 602 with 14 diners, 622, 624, 626, 628, 630, 632, 634, 636, 638, 640, 642, 644, 646, and 648, seated around it. As shown, the system has configured four conversation groups: conversation group #1 606, conversation group #2 608, conversation group #3 610, and conversation group #4 612. The digital signal processing 808 localizes microphone beamforms and speaker sound cones to enable diners, 624, 626, 628, and 630, to converse as conversation group #1 606; diners 632, 634, 636, and 638, to converse as conversation group #2 608, diners 640, 642, and 644, to converse as conversation group #4 612, and diners 646, 648 and 622 to converse as conversation group #3 610.

Figure 7:
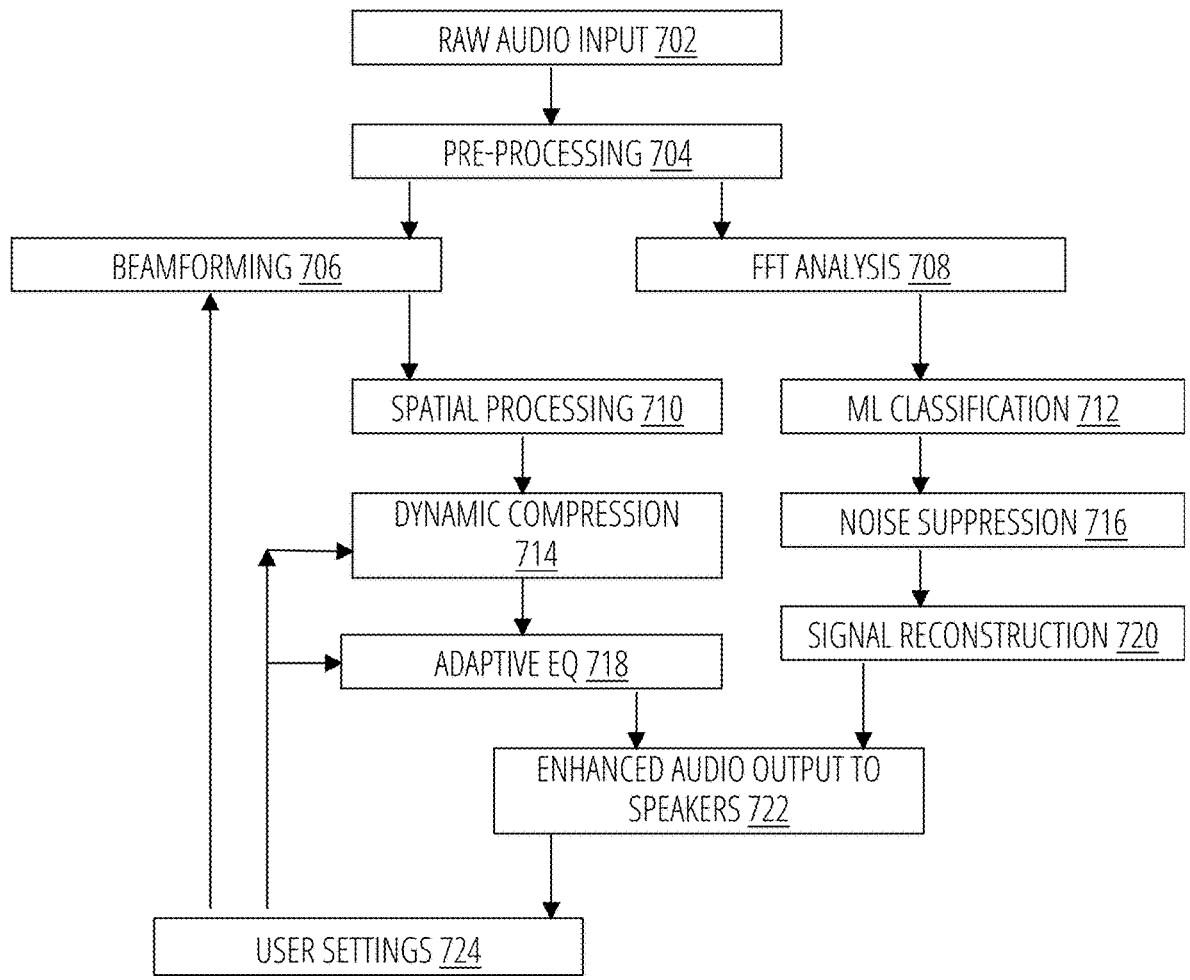
FIG. 7 shows the steps in the digital signal processing.

FIG. 7 depicts the digital signal processing that occurs within the system.

Raw audio input 702 from the microphones is subjected to signal conditioning and normalization in a pre-processing step 704. The preprocessing step also includes microphone beamforming 706 through spatial processing 710 and directional focus. Fast Fourier Transformation (FFT analysis 708) results in frequency domain representation that facilitates discriminating between speech and noise through machine learning classification (ML classification 712), which in turn enables noise suppression 716 through spectral subtraction and speech signal reconstruction 720 through inverse Fast Fourier Transformation and synthesis feeding enhanced audio output to the speakers 722 with a latency of less than 15 milliseconds.

The FFT analysis combines with the beamforming step to enable spatial processing and dynamic compression 714, followed by adaptive equalization and frequency enhancement (adaptive EQ 718), which shapes the audio output to the speakers.

A user can adjust noise cancellation and volume through user settings 724, which send commands to the beamforming algorithms and the dynamic compression and adaptive equalization functions.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

A method for enhancing speech intelligibility at restaurant tables captures speech signals via directional microphones embedded in a table structure and processes the captured signals to isolate speech from ambient noise, enhancing speech clarity through adaptive frequency response. It delivers processed speech signals through directional speakers to specific listening positions and allows user adjustment of enhancement parameters.

The method may include automatic activation when diners are seated at the table, dynamic adjustment of microphone focus as different diners speak, and capture and preservation of spatial audio cues in processed speech signals. It may also allow for creation of separate audio zones for subgroups engaged in different conversations at one table.

Figure 8:
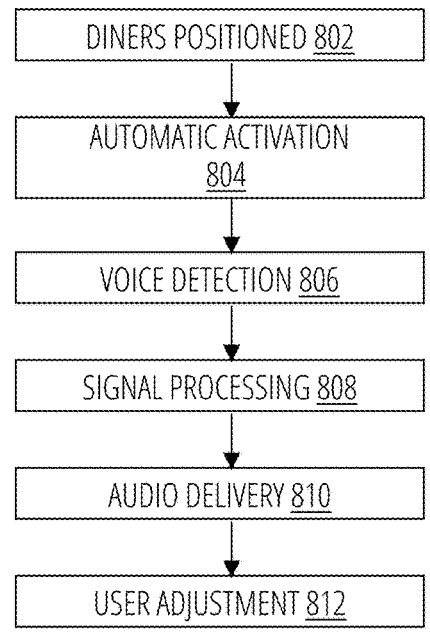
FIG. 8 depicts the method for use.

FIG. 8 depicts a method for using the system.

As diners are seated and positioned 802, the low powered lasers integral to the speakers are illuminated to assist positioning diners within the cone of sound emitted by the speaker.

The system activates automatically 804 when diners are seated, detecting presence through weight sensors or manual activation by restaurant staff.

When a diner speaks, voice detection 806 causes the beamforming microphone array to focuses on his voice while rejecting off-axis sounds.

The captured speech undergoes real-time noise suppression and clarity enhancement via the digital signal processing 808 (DSP) unit.

Audio delivery 810 occurs as the processed speech is delivered through directional speakers to other diners at the table, creating natural conversation dynamics despite ambient noise.

Diners make can make user adjustments 812, fine-tuning audio settings according to personal preference via the control interface.

The system preserves the natural rhythm and flow of conversation while significantly enhancing speech intelligibility, allowing diners to converse at normal speaking volumes even in loud restaurant environments.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Feedback Mitigation

To prevent and control audio feedback (the annoying "howling" or echo effect that occurs when a microphone picks up sound from a nearby speaker), the TableConverse Audio System incorporates multiple technical safeguards.

Omnidirectional microphones would pick up sound from all directions, including speaker output, leading to feedback loops. To avoid this phenomenon, the system uses beamforming microphone arrays that focus on sound coming from a seated user's mouth (directional pickup). Adaptive algorithms track the speaker's position and reject off-axis sound (e.g., from adjacent speakers).

Even directional microphones may pick up some speaker output, causing delayed echoes. The system anticipates and avoids this problem with real-time echo cancellation (via DSP) that compares the speaker's output signal with the microphone input and subtracts any matching waveforms. Adaptive filters continuously adjust to changing acoustics, for example, if a seated user moves his head.

Continuous microphone operation would increases feedback risk. System microphones activate when speech is detected (via VAD-Voice Activity Detection). When a user stops speaking, that user's microphone briefly mutes, preventing residual noise from looping.

Traditional speakers radiate sound in all directions, increasing microphone pickup. The system uses focused speaker arrays, such as ultrasonic or parametric speakers, that direct sound to a particular seated diner's seat, minimizing spillover to microphones.

Feedback often occurs at specific resonant frequencies. The system automatically detects and attenuates frequencies prone to feedback. Machine learning identifies and suppresses feedback before it becomes audible.

To avoid vibrations' from speakers or other sources traveling through the table into microphones, microphones are vibration-isolated by mounted them on dampening materials or frames.

Because delays between microphone pickup and speaker output can cause phase cancellation, the system uses ultra-low-latency processing (less than 10 milliseconds) to ensure near-instantaneous audio playback, preventing echo buildup.

Alternative Embodiments

Integration with Building Systems: The system can interface with restaurant ambient sound systems to create complementary audio profiles that enhance speech intelligibility.

Multi-language Support: An enhanced version of the system can incorporate real-time translation capabilities, allowing conversations between diners speaking different languages.

Hearing Assistance Integration: The system can provide specialized frequency enhancement for hearing-impaired diners based on their specific audiological profile.

I claim:

1. A speech enhancement system for restaurant tables comprising:
   a restaurant table comprising a table structure;
   a plurality of directional microphones embedded in the table structure, configured to capture speech from seated diners;
   a digital signal processing unit configured to:
   isolate speech signals from ambient noise;
   compare each seated diner's speech through a microphone input and to subtract matching waveforms in an output signal aimed at the seated diner;
   use adaptive filters that continuously adjust to changing acoustics, such as if a seated user moves his head;
   dynamically assign directional microphones to individual diners based on real-time detection of speaker position and speech detection confidence, and suppress audio from overlapping speaker zones to prevent conversational cross-talk in an open restaurant environment;
   employ real-time machine learning to classify and enhance speech signals while maintaining a processing latency below 15 milliseconds;
   a plurality of directional speakers positioned to deliver enhanced speech signals to specific listening positions;
   a plurality of low power lasers aligned with the directional speakers and configured to project beams of light downward to assist in positioning diners within focused audio zones without requiring wearable devices; and
   a user control interface allowing adjustment of audio enhancement parameters including volume, noise cancellation intensity, and ambient sound mix.

2. The system of claim 1, wherein the directional microphones comprise a beamforming array configured to:
   track and isolate speech dynamically from active speakers in a plurality of multiple seated users while rejecting off-axis noise, based on real-time time-of-arrival analysis and machine learning-based user profiles trained to recognize individual speaker characteristics;
   capture and maintain spatial audio cues to preserve natural conversation dynamics by tagging speech with positional metadata; and
   represent such isolated speech with amplitude, frequency, position, and phase data such that it can be reproduced by a plurality of directional speakers or bone conduction transducers integrated into dining chair headrests or seatbacks for non-wearable audio delivery.

3. The system of claim 1, wherein the digital signal processing unit employs machine learning algorithms trained specifically to distinguish human speech originating at the same table from restaurant ambient noise, including speech originating from adjacent tables or elsewhere in the restaurant, by analyzing spectral and temporal patterns in real-time.

4. The system of claim 1, wherein the directional speakers utilize parametric audio technology and constructive interference to create focused sound beams directed at specific listening positions-, and dynamically adjust beam direction based on diner movement to maintain audio zone alignment without audio leakage to adjacent tables.

5. The system of claim 1, further comprising bone-conduction transducers integrated into dining chair headrests or seatbacks for alternative audio delivery-, delivering speech vibrations directly to a diner's skull to bypass ambient noise without requiring ear-worn devices.

6. The system of claim 1, further comprising bone-conduction transducers with adaptive force modulation based on seat pressure sensors, adjusting vibration intensity in response to detected diner posture to optimize audio transmission.

7. The system of claim 1, further comprising a failover system that transitions from bone conduction to air-conduction speakers upon detecting loss of back contact, ensuring continuous audio delivery when diners lean forward beyond a threshold separation from the seatback.

8. The system of claim 1, wherein the user control interface includes both a table-embedded interface and a wireless mobile application interface, allowing diners to adjust audio settings and select conversation groups manually via a touchscreen or smartphone without external hardware.

9. The system of claim 1, wherein the digital signal processing unit maintains spatial audio cues to preserve natural conversation dynamics, reproducing directional sound to emulate the original speaker's position relative to each listener.

10. The system of claim 1, wherein the system operates with signal processing latency below 15 milliseconds to ensure natural conversation timing-, achieved through optimized machine learning and beamforming algorithms.

11. The system of claim 1, further comprising an ambient sound mixing capability allowing users to adjust levels of environmental sound preserved in an audio output, enabling personalization of the restaurant atmosphere while enhancing speech intelligibility.

12. The system of claim 1, wherein the microphones include vibration isolation mounting to prevent capture of table-transmitted sounds, such as silverware or plate movement, using dampening materials or frames.

13. The system of claim 1, further comprising wireless connectivity allowing integration with mobile devices and hearing aids, enabling smartphone-based control and compatibility with personalized hearing profiles.

14. A method for enhancing speech intelligibility at restaurant tables comprising:
   capturing speech signals via directional microphones embedded in a table structure;
   processing the captured signals to isolate speech from ambient noise;
   enhancing speech clarity through adaptive frequency response;
   delivering processed speech signals via directional speakers to specific listening positions; using parametric audio technology to create focused sound beams; and
   allowing user adjustment of enhancement parameters via a table-embedded or mobile interface to personalize audio settings.

15. The method of claim 14, further comprising automatic activation when diners are seated at the table, triggered by weight sensors or manual activation by restaurant staff.

16. The method of claim 14, further comprising dynamically adjusting microphone focus as different diners speak, using beamforming and real-time speaker detection to track active speakers.

17. The method of claim 14, further comprising creating separate audio zones for subgroups engaged in different conversations at one table, routing speech signals to specific diners based on detected conversation groupings.

18. The method of claim 14, further comprising capturing and preserving spatial audio cues in the processed speech signals, reproducing directional sound to maintain natural conversational dynamics.

\* \* \* \* \*